United States Patent [19] [11] 3,859,138
Narsavage et al. [45] Jan. 7, 1975

[54] NOVEL COMPOSITE FUEL CELL ELECTRODE

[75] Inventors: Stephen T. Narsavage; Raymond W. Vine, both of Bolton; Roger C. Emanuelson, Glastonbury, all of Conn.

[73] Assignee: United Aircraft Corporation, East Hartford, Conn.

[22] Filed: Jan. 11, 1974

[21] Appl. No.: 432,581

[52] U.S. Cl. ................... 136/120 FC, 136/86 D
[51] Int. Cl. ................................. H01m 27/04
[58] Field of Search ........ 136/120 FC, 120 R, 86 D, 136/145–146; 161/70

[56] References Cited
UNITED STATES PATENTS
3,386,859  6/1968  Biddick ........................ 136/120 FC
3,476,601  11/1969  Berger et al. .................. 136/120 R
3,650,102  3/1972  Economy et al. ................. 161/70 X Primary Examiner—Anthony Skapars
Attorney, Agent, or Firm—Stephen E. Revis

[57] ABSTRACT

Electrode substrates comprising infusible, cured novolac fibers and silicon dioxide fibers are fabricated into a suitable form. The substrate is made electrically conductive by heat treatment in an inert atmosphere to render the novolac fibers conductive. The substrates are relatively inexpensive, have good resistance to acid and alkaline electrolytes, have low ohmic resistance, and when treated with an electrocatalyst provide a highperformance electrode.

6 Claims, No Drawings

NOVEL COMPOSITE FUEL CELL ELECTRODE

FIELD OF INVENTION AND BACKGROUND

This invention relates to electrode structures and to their manufacture. More particularly, the invention is directed to inexpensive, fibrous electrode structures having good resistance to acids and, thus, particularly suited for acid fuel cells, and having low ohmic resistance.

Considerable attention has been directed to fuel cells and to fuel cell components in recent years in an effort to obtain improved sources of electrical energy. Essentially, a fuel cell is an electrochemical device in which part of the energy of a chemical reaction is converted directly into direct current electrical energy. One of the more significant advantages of fuel cells over conventional methods of generating electricity is the directness by which chemical energy is converted into electrical energy eliminating the necessity of converting chemical energy into heat, thereby avoiding the inefficiencies associated with the Carnot heat cycle. Other advantages include quietness, cleanliness, and the reduction or the complete elimination of moving parts.

In the construction of fuel cells, a need exists for electrodes which have a high electrochemical performance; have a long life in the environment of the fuel cell, i.e., in the environment of an acid or alkaline electrolyte, possibly at relatively high temperatures, and are inexpensive. Moreover, as is apparent, the electrode structure must either be intrinsically electrically conductive, or it must be used in association with a conductive current collector or the like. Additionally, the structure must be capable of being uniformly produced, having relatively high structural strength, and be light in weight.

In the quest for improved electrode structures, efforts have been made to provide porous substrates upon which a catalytic material such as a uniform admixture of catalytic metal, such as platinum, and a binder material, such as polytetrafluoroethylene, is uniformly applied. These substrate materials, as seen from U.S. Pat. No. 3,386,859, have included the utilization of fibrous materials such as asbestos. Moreover, British Pat. No. 1,160,084 has suggested the fabrication of matrices for use in fuel cell construction comprising fibrous polymers such as polytetrafluoroethylene, and having uniformly dispersed therein wettable fillers including silicon dioxide, potassium titanate, titanium dioxide, and zirconia. Other patents, such as U.S. Pat. No. 3,476,601, disclose the incorporation of inorganic fibers into an electrode structure.

SUMMARY OF INVENTION

In accordance with the present invention, it has been found that inexpensive fibrous electrode substrates can be provided by selectively admixing organic fibrous materials and inorganic fibrous materials, forming a substrate, and rendering the substrate conductive by heat treatment in an inert atmosphere, such as nitrogen at a temperature greater than 600°C., whereby the organic fibers are rendered conductive. Accordingly, a substrate structure is provided which has the essential strength characteristics imparted by the inorganic fibers, as well as high resistance to alkaline and acid electrolytes, with the necessary conductivity being obtained through the use of organic fibers rendered conductive through heat treatment in an inert atmosphere.

The structure, having the essential high resistance to the alkaline and acid conditions of a fuel cell, in addition have the low ohmic resistance needed to conduct electrical current across the electrode eliminating the need of collector plates, but yet being relatively inexpensive and capable of being reproducibly manufactured.

The organic fibrous materials which are employed herein are preferably infusible, cured novolac fibers which are produced by fiberizing a novolac melt to produce a thermoplastic, uncured novolac fiber and thereafter curing the novolac fiber by heating the fiber in a formaldehyde environment in the presence of an acid catalyst. These fibers, and their manufacture, are described in U.S. Pat. No. 3,650,102, the teaching of which is incorporated herein by reference. Essentially, the novolac resin is made from a mixture of phenol-formaldehyde in an aqueous solution catalyzed with an acid catalyst, such as sulfuric acid, to produce a novolac material employing conventional reflux techniques. The novolac melt is then drawn into a fiber to provide an uncured novolac fiber, again using conventional techniques. Thereafter, the fibers are cured in an acid catalyzed formaldehyde environment. The novolac fibers useful herein can be prepared from a wide variety of novolacs, with the term novolac referring to the condensation product of a phenolic compound with formaldehyde, the condensation being carried out in the presence of an acid catalyst to form a novolac resin wherein there are virtually no methylol groups such as are present in resoles, and wherein the molecules of the phenolic compound are linked together through methylene groups. The phenolic compound may be an unsubstituted phenol or a phenol wherein one or more of the non-hydroxyl hydrogens are replaced by any of various substituents attached to the benzene ring, a few examples of which are the alkylphenols, chlorophenols, resorcinol, hydroquinone, and the like. Virtually any fusible novolac can be employed which is capable of further polymerization with a suitable aldehyde such as formaldehyde for the production of the fibers. It is only essential that the novolac molecules have two or more available sites for further polymerization. The average number molecular weight of the novolacs will be from about 500 to about 1200, although the molecular weight can be as low as 300 and as high as 2000 to obtain useful fibers. The fibers can be produced using conventional spinning equipment well known in the art as, for example, melt spinning equipment of the type shown in the aforesaid U.S. Pat. No. 3,650,102.

Although the infusible, cured novolac resins are preferred as the organic fibers according to the present invention, other organic fibers can be utilized so long as they are capable of being rendered conductive, as, for example, by heat treatment in an atmosphere of inert gas such as nitrogen.

The inorganic fibers employed in accordance with the invention are preferably high purity silicon dioxide fibers. However, other inorganic fibrous materials such as fibrous potassium titanate, fibrous zirconia, fibrous lead dioxide, and the like, can be employed with it only being essential that the inorganic fibers provide the necessary structural strength and high resistance to acids and alkalis.

As a preferred embodiment, an electrode was made as follows:

25 weight percent silicon dioxide fibers, and 75 weight percent infusible, cured novolac resin supplied under the tradename Kynol fiber, by The Carborundum Company, Niagara Falls, N.Y., was fabricated into a structure 5 inches in diameter and 15 mils thick using conventional paper fabrication techniques. Thereafter, the structure was coated at one surface with an aqueous suspension of platinum black and TFE 30, Teflon manufactured by the duPont Company, with the catalyst loading being 4 mg/cm$^2$ and containing 30 percent by volume Teflon, with the balance being platinum black. The structure was highly resistant to an acid electrolyte environment and had an electrical resistance of 25 ohms across a 2.5 inch length of electrode. When two electrodes as made above were incorporated into a fuel cell separated by an acid electrolyte, the cell provided an average performance of 170 mA/cm$^2$ at 0.8 volts, the cell being operated at 75°C.

The ratio of inorganic fiber to organic fiber is critical to the extent that the structure must possess the high structural strength and have the necessary conductivity. Operable ratios range from 15 to 40 weight percent of inorganic material relative to the organic fibers. It is to be understood, however, that minor amounts of other materials can be incorporated into the substrate without departing from the present invention. Moreover, it is to be understood that the substrate made from the inorganic and organic fibers in accordance with this invention can be utilized without the heat treatment, provided conductivity of the element is not required as, for example, when the element is used as an electrolyte matrix or as a separator plate, or the like. Such embodiments being within the ability of one skilled in the art are covered by the appended claims.

It is claimed:

1. The method of providing a fuel cell element comprising admixing from 85 to 60 percent of an infusible, cured novolac fiber with 15 to 40 percent of high purity silicon dioxide and forming said admixture into a substrate; heat-curing said substrate in the presence of an inert gas to render said novolac fibers conductive; and disposing of said structure in a fuel cell, said percentages being on a weight basis relative to each other.

2. The method of claim 1 wherein the inert gas is nitrogen.

3. The method of claim 2 wherein the heat treatment is greater than 600°C.

4. The method of claim 1 including the additional step of applying a catalytic layer of electrocatalyst and hydrophobic binder to said substrate.

5. A fuel cell element disposed in a fuel cell comprising a substrate containing from 85 to 60 percent infusible, cured novolac fiber, and 15 to 40 percent silicon dioxide.

6. The structure of claim 5 wherein the infusible, cured novolac fiber is electrically conductive.

* * * * *